C. H. JOHNSON.
Sleigh.
No. 95,907.
Patented Oct. 19, 1869.
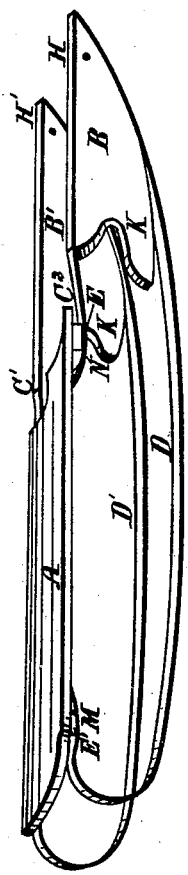

United States Patent Office.

C. H. JOHNSON, OF CHELSEA, MASSACHUSETTS, ASSIGNOR TO HIMSELF AND CHARLES LIBBEY, OF WHITEFIELD, NEW HAMPSHIRE.

Letters Patent No. 95,907, dated October 19, 1869.

IMPROVEMENT IN SLEIGH AND SLED-RUNNERS.

The Schedule referred to in these Letters Patent and making part of the same.

To all whom it may concern:

Be it known that I, C. H. JOHNSON, of Chelsea, in the county of Suffolk, and State of Massachusetts, have invented certain new and useful Improvements in Runners for Sleds and Sleighs; and I do hereby declare that the following is a full and exact description thereof, reference being had to the accompanying drawing, and to the letters of reference marked thereon.

The nature of my invention consists in connecting with the forward end of the runner, which is unyielding, an elastic strip of wood or metal, which serves as a runner, and also as a spring. I also connect this strip to the rear end of the body, the front end of the body being supported by an elastic strip or spring, connecting it with the unyielding part of the runner.

To enable others skilled in the art to make and use my invention, I will proceed to describe its construction and use.

In the drawing, I have represented my invention as applied to a sled-runner, in perspective.

I construct my invention as follows:

A represents the body of the sled.

B and B', the forward or rigid parts of the runners.

D and D' are springs, made of any suitable material, and made fast at the forward ends of the runners, and at the rear end of the body, as shown.

These pieces D and D' serve as runner-irons, springs, and also to connect the forward part of the runners to the rear part of the body.

The front end of the body is connected to the forward part of the runners by the elastic strips $C^1$ and $C^2$.

The runner-irons D D' are so bent and attached to the forward part of the runner, that they naturally spring off from the under edge of runner, at K, thus giving an elasticity to the vehicle, which renders it very pleasant.

The springs $C^1$ $C^2$ also give elasticity.

From the above it will be seen that a sled or sleigh made by my method, will be quite light and simple in detail, and at the same time very elastic in its action.

What I claim as my invention, and desire to secure by Letters Patent of the United States, is—

In a sled or sleigh-runner, the combination of the head-piece B, the elastic runner-iron D, the springs $C^1$ $C^2$, and body A, made and connected substantially as described, and for the purpose set forth.

C. H. JOHNSON.

Witnesses:
    JAS. S. CONANT,
    WILLIAM EDSON.